United States Patent [19]

Marinus

[11] Patent Number: 5,674,422
[45] Date of Patent: Oct. 7, 1997

[54] RESET AND WATCHDOG SYSTEM FOR A MICROPROCESSOR, AND APPLIANCE COMPRISING MICROPROCESSOR AND SUCH A SYSTEM

[75] Inventor: Harry Marinus, Drachten, Netherlands

[73] Assignee: U.S. Philips Corporation, New York, N.Y.

[21] Appl. No.: 417,291

[22] Filed: Apr. 5, 1995

[30] Foreign Application Priority Data

Apr. 6, 1994 [EP] European Pat. Off. ............ 94200927

[51] Int. Cl.$^6$ ........................................... H05B 1/02
[52] U.S. Cl. .................. 219/497; 219/452; 219/481; 219/494; 371/67.1
[58] Field of Search ......................... 219/450–452, 219/457, 506, 501, 508, 488, 481, 494; 364/424.03, 424.04; 371/67.1, 68.3

[56] References Cited

U.S. PATENT DOCUMENTS

| | | | |
|---|---|---|---|
| 4,304,003 | 12/1981 | Kakizawa et al. | 371/62 |
| 4,541,050 | 9/1985 | Honda et al. | 364/424 |
| 4,580,220 | 4/1986 | Braun et al. | 364/431.11 |
| 4,586,179 | 4/1986 | Sirazi et al. | 371/12 |
| 4,685,053 | 8/1987 | Hattori et al. | 364/184 |
| 4,745,542 | 5/1988 | Baba et al. | 364/426 |
| 4,906,979 | 3/1990 | Kimura | 340/658 |

*Primary Examiner*—Mark H. Paschall
*Attorney, Agent, or Firm*—Ernestine C. Bartlett

[57] ABSTRACT

A system comprising a microprocessor and a reset and watchdog circuit. The microprocessor generates a first pulse train (P1) to indicate the correct operation of the microprocessor and the reset and watchdog circuit generates a reset signal (RST) in response to an irregularity in the occurrence of the first pulse train. The first pulse train is a substantially synchronous software copy of a second pulse train (P2) which is received by the microprocessor and which is preferably a limited a.c. supply voltage signal. This copy is generated by an appropriate programming of the microprocessor. The reset and watchdog circuit receives the first pulse train (P1) and the second pulse train (P2) and supplies the reset signal (RST) in response to a disturbed synchronism between the occurrence of the first pulse train and the second pulse train.

17 Claims, 3 Drawing Sheets

5,674,422

RESET AND WATCHDOG SYSTEM FOR A MICROPROCESSOR, AND APPLIANCE COMPRISING MICROPROCESSOR AND SUCH A SYSTEM

BACKGROUND OF THE INVENTION

This invention relates to a system comprising a microprocessor and a reset and watchdog circuit, the microprocessor generating a pulse train to indicate the correct operation of the microprocessor and the reset and watchdog circuit generating a reset signal in response to an irregularity in the occurrence of the pulse train.

The invention further relates to a microprocessor-controlled mainspowered appliance comprising such a system.

Such a system is known, inter alia from U.S. Pat. No. 4,586,179. The reset and watchdog circuit generates a reset signal for the microprocessor when the power supply is turned on. Subsequently, the microprocessor generates a pulse train, which indicates whether the microprocessor operates correctly. The pulse train pattern depends on the programming of the microprocessor. This pulse train is monitored by the reset and watchdog circuit. In the event of a disturbance, for example, as a result of a brief temporary supply voltage drop, a defect in the microprocessor or any other cause, the pulse train pattern is disturbed or the pulse is temporarily absent. The disturbance is detected by the reset and watchdog circuit, which then supplies a reset signal to the microprocessor. For the purpose of detection the known reset and watchdog circuit comprises a timer based on a monostable multivibrator. This timer is constantly retriggered by the edges of the pulse train. The timer supplies a reset signal as soon as the edges fail to appear or are too late. The time constant of the timer is determined by external components and is adapted to the period of the pulse train.

This known system has some drawbacks. The generation of the pulse train requires a comparatively long computing time in the microprocessor. The period of the pulse train should not be too long because this requires a large time constant in the reset and watchdog circuit. Moreover, an external reset and watchdog circuit is required, which is based on a time constant adapted to the period of the pulse train.

SUMMARY OF THE INVENTION

It is one of the objects of the invention to provide a simple system with a microprocessor and a reset and watchdog circuit. To this end, in accordance with the invention, the system of the type defined in the opening paragraph is characterised in that the pulse train is a first pulse train generated by an appropriate programming of the microprocessor and which is a substantially synchronous derivative from a second pulse train to be received by the microprocessor, and the reset and watchdog circuit is adapted to receive the first pulse train and the second pulse train and to supply the reset signal in response to a disturbed synchronism between the occurrence of the first pulse train and the second pulse train.

The microprocessor makes a software copy of the received second pulse train. This copy, i.e. the first pulse train, has edges which substantially coincide with the edges of the received second pulse train. The copying software can be very simple and requires hardly any computing time. The reset and watchdog circuit compares the two pulse trains with one another. When the synchronism between the two pulse trains is disturbed the reset and watchdog circuit generates a reset signal. In principle, the second pulse train received by the microprocessor can be any signal of arbitrary period. It can be generated with a very simple oscillator, on which no accuracy requirements are imposed. An embodiment of the system in accordance with the invention which is very advantageous in this respect is characterised in that the second pulse train is derived from the a.c. mains voltage. In this case no oscillator at all is required because the a.c. mains voltage has a known and also low period, which can be convened into a pulse train by means of a simple limiter circuit.

The first pulse train generated by the microprocessor need not be an exact copy of the received second pulse train. The copy may be phase-shifted or in phase opposition or it may have another duty cycle than the received second pulse train. This depends on the implementation of the reset and watchdog circuit. A further embodiment of a system in accordance with the invention is characterised in that the reset and watchdog circuit comprises a coincidence circuit for supplying the reset signal when the time between the edges of the first pulse train and the second pulse train exceeds a predetermined limit. Such a reset and watchdog circuit is very suitable for pulse trains whose edges are substantially in phase with one another. In such a case the microprocessor should merely copy the edges of the received second pulse train to form the first pulse train.

An advantageous embodiment of the system in accordance with the invention is further characterised in that the system comprises:

- a first comparator for comparing the instantaneous value of the first pulse train with a first reference voltage and having a first output for supplying a first pulse train which is inverted relative to the first pulse train,
- a second comparator for comparing the instantaneous value of a limited a.c. mains voltage with a second reference voltage and having a second output for supplying the second pulse train,
- a diode connected between the first output and the second output, and
- a third comparator having a first input for receiving the first reference voltage and a second input, which is coupled to the first output. This reset and watchdog circuit advantageously combines the power-on rest, the watchdog function, the watchdog reset and the generation of the second pulse train from the a.c. mains voltage.

The first pulse train always slightly lags the second pulse train. The coincidence circuit could respond to this slight phase difference and generate undesired reset signals. This can be precluded simply by means of a further embodiment, which is characterised in that the system further comprises a low-pass filter for filtering the signal transfer from the first output of the first comparator to the second input of the third comparator. The low-pass filter rejects any short pulses resulting from a small phase difference between the second pulse train and the first pulse train.

The system in accordance with the invention is particularly suitable for mains-powered microprocessor-controlled electrical appliances. Examples of such appliances are thermal appliances for domestic use such as a flat-iron, coffee maker, electric kettle, deep fryer, roaster, cook-top oven, grill, microwave oven, hot-plate, room-heating appliance, radiant heater, fan heater, hair dryer, hair curler, bread toaster, sandwich toaster or electric blanket. Moreover, the appliance can be a motor-driven appliance such as a vacuum-cleaner, coffee grinder, juicer, mixer or fan. Other uses are: a timer, solarium, shaver, audio and video equipment, and computer.

BRIEF DESCRIPTION OF THE DRAWINGS

These and other aspects of the invention will be described and elucidated with reference to the accompanying drawings, in which.

In these Figures like elements bear the same reference symbols.

DESCRIPTION OF THE PREFERRED EMBODIMENTS

Figure 1:
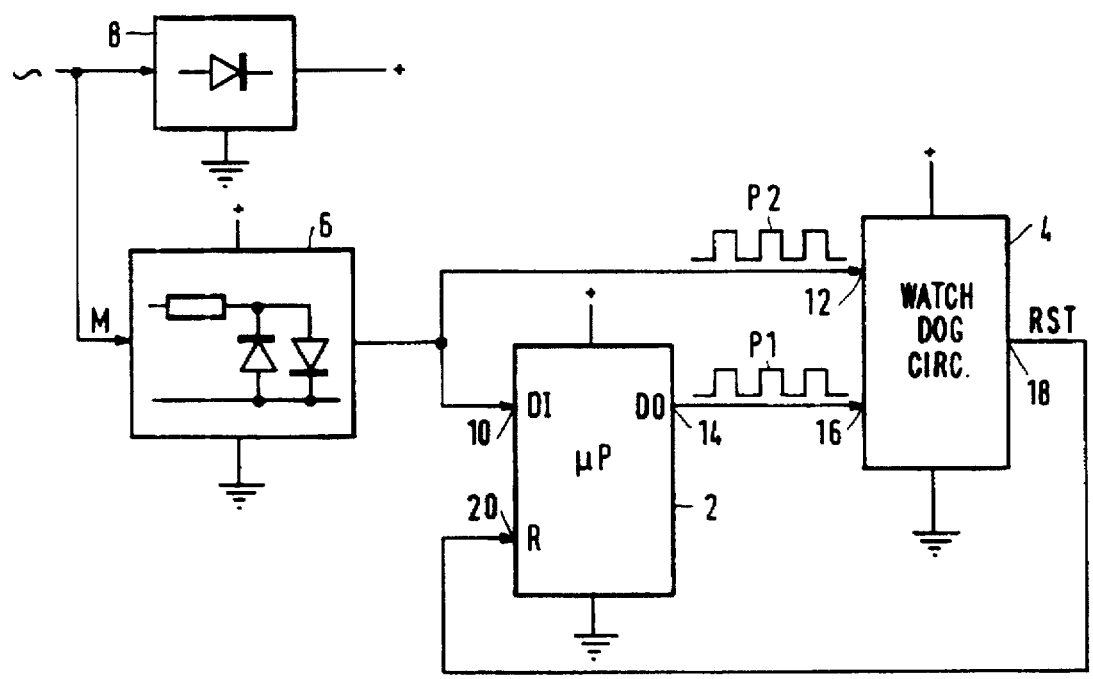
FIG. 1 shows a block diagram of a system with a microprocessor and a reset and watchdog circuit in accordance with the invention.
Figure 2:
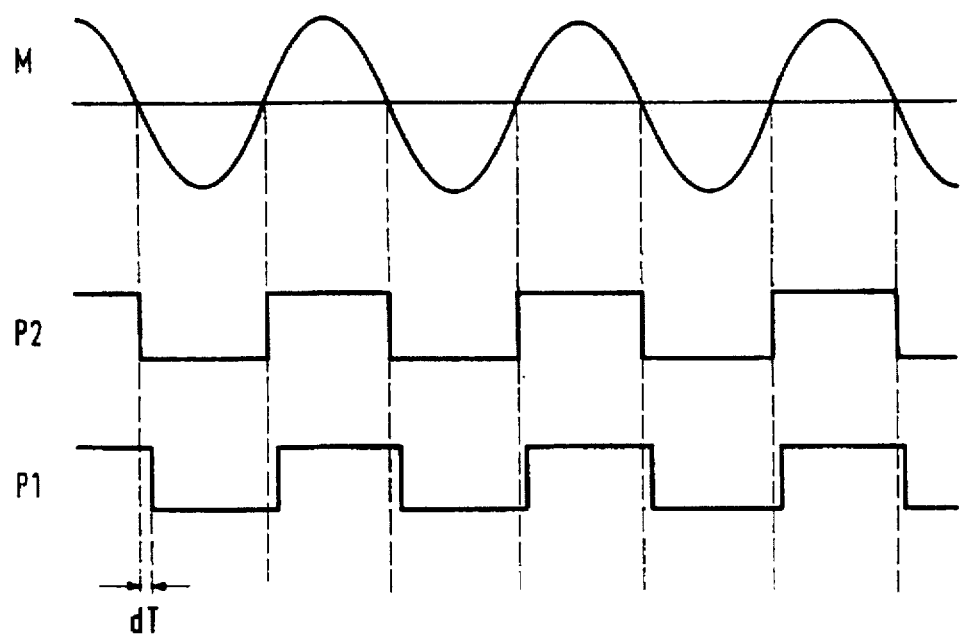
FIG. 2 shows signal waveforms relating to the block diagram in FIG. 1.

FIG. 1 shows the block diagram of a system comprising a microprocessor 2, a reset and watchdog circuit 4, a limiter circuit 6 and a mains-voltage rectifier 8. The limiter circuit 6 converts the a.c. mains voltage M into a second pulse train P2 as shown in FIG. 2. The second pulse train P2 is applied to a data input 10 of the microprocessor 2 and to a first input 12 of the reset and watchdog circuit 4. The microprocessor 2 copies the second pulse train P2 under software control so as to produce a first pulse train P1, shown in FIG. 2, on a data output 14. The first pulse train P1 has a small delay dT relative to the second pulse train P2. The shape of the first pulse train P1 is software dependent. The delay dT may be larger and the duty cycle of the first pulse train P1 may differ from that of the second pulse train P2, which is also dependent on the reset and watchdog circuit 4 which is used. However, the period of the two pulse trains P1 and P2 is the same. The reset and watchdog circuit 4 further has a second input 16, which is connected to the data output 14 of the microprocessor 2, and a reset output 18 for supplying a reset signal RST to a reset input 20 of the microprocessor 2. The reset and watchdog circuit 4 generates a reset signal when the synchronism in the occurrence of the second pulse train P2 and the first pulse train P1 is disturbed. This may be the case if the first pulse train P1 is temporarily absent or has an excessive time delay as a result of a disturbance in the microprocessor 2. Instead of a limited a.c. mains voltage M it is possible to use any periodic signal which is generated, for example, by means of a simple RC oscillator whose frequency and/or duty cycle need hardly meet any accuracy requirements as long as the microprocessor 2 is capable of following and copying the edges. The reset and watchdog circuit 4 can be constructed in various manners. A coincidence circuit, for example, a logic AND or XOR, is suitable depending on the phase relationship between the pulse trains.

Figure 3:
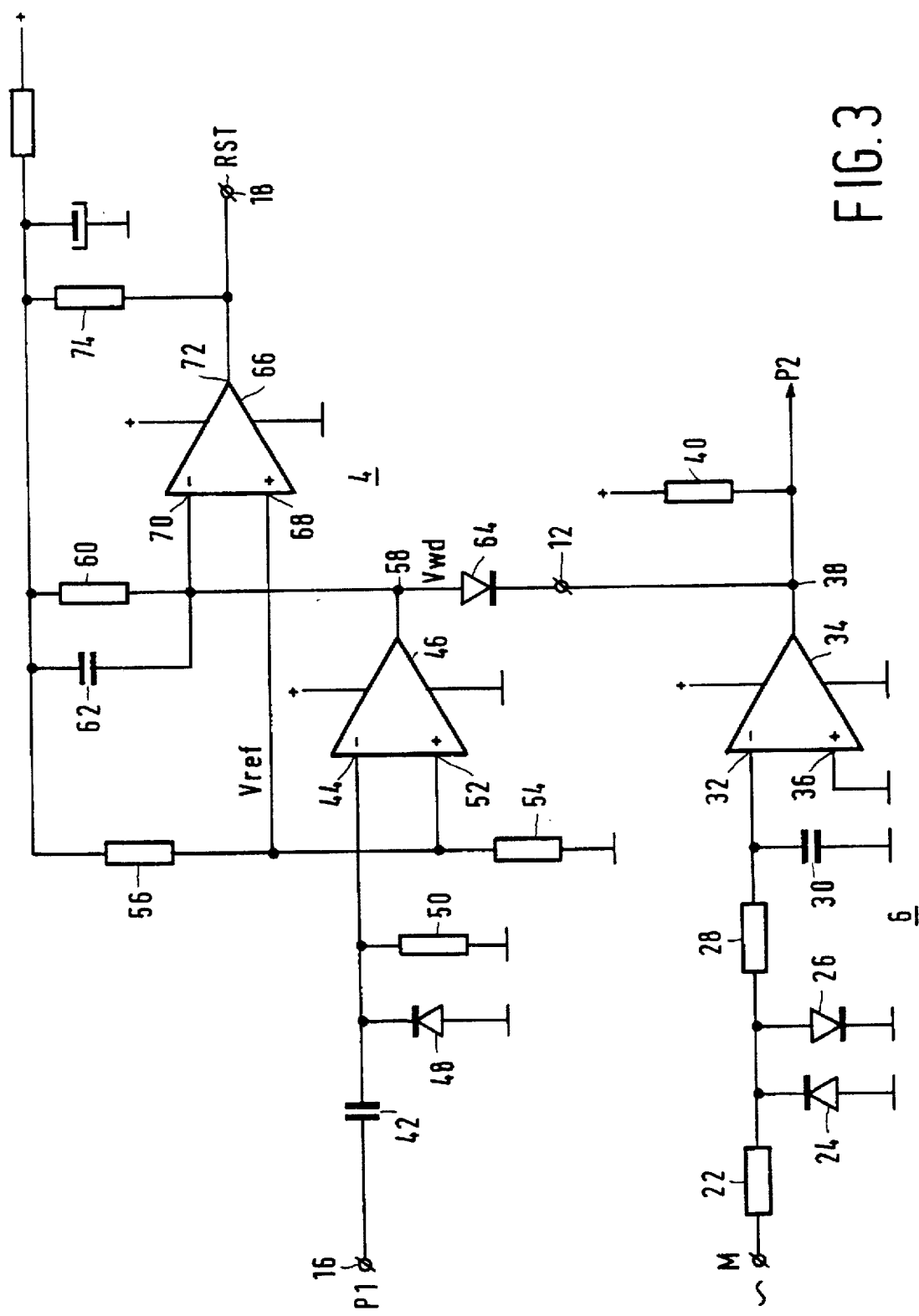
FIG. 3 is a circuit diagram of a circuit for use in a system in accordance with the invention.

FIG. 3 shows a circuit diagram of a circuit which combines the reset and watchdog circuit 4 and the limiter circuit 6 by means of three comparators. The a.c. mains voltage M is limited by means of a series resistor 22 and two diodes 24 and 26 in antiparallel, is filtered to suppress RF interference by means of an RC filter comprising a series resistor 28 and a capacitor 30, and is subsequently applied to the inverting input 32 of a comparator 34. The non-inverting input 36 of the comparator 34 is connected to ground. The output 38 of the comparator 34 is connected to the positive supply voltage via a pull-up resistor 40 and supplies the second pulse train P2, whose voltage alternates between ground potential and the positive supply voltage. The output 38 is connected to the first input 12 of the reset and watchdog circuit 4 and also leads to the data input 10 of the microprocessor 2.

The first pulse train P1 from the data output 14 of the microprocessor 2 appears on the second input 16 of the reset and watchdog circuit 4 and is applied to the inverting input 44 of a comparator 46 via a coupling capacitor 42. The inverting input 44 is connected to ground via a diode 48 and a resistor 50. The diode 48 conducts for negative-going steps of the first pulse train P1. Thus, the comparatively low signal value of the first pulse train P1 is fixed substantially at ground potential. The noninverting input 52 of the comparator 46 is connected to ground via a resistor 54 and to the positive supply voltage via a resistor 56. The resistors 54 and 56 function as a voltage divider and supply a reference voltage Vref to the non-inverting input 52 of the comparator 46. The output 58 supplies a watchdog signal Vwd, which is inverted relative to the first pulse train P1, as long as the first pulse train P1 is present. If the first pulse train P1 is absent the resistor 50 ensures that the voltage on the inverting input 44 becomes equal to ground potential, regardless of the d.c. level of the data output 14. When the first pulse train P1 is interrupted the output 58 therefore tends to assume a comparatively high signal level. The output 58 is connected to the positive supply voltage via a pull-up resistor 60 and a filter capacitor 62 in parallel with this resistor. The output 58 is further connected, via a diode 64, to the first input 12 and hence to the output 38 of the comparator 34. The cathode of the diode 64 is situated at the side of the output 38. The comparator 34 can therefore pull the output 58 of the comparator 46 to ground potential via the diode 64 if the output 58 is at a high signal level.

The circuit further comprises a comparator 66 whose non-inverting input 68 receives the reference voltage Vref and whose inverting input 70 is connected to the output 58. The comparator 66 has an output 72, which is connected to the positive supply voltage via a pull-up resistor 74. The reset output 18 is connected to the output 72 and supplies an active low reset signal RST when the output 58 is at a high signal level. This is the case in the absence of the first pulse train P1. In all other cases the watchdog signal Vwd and the second pulse train P2 are in phase opposition. If the watchdog signal Vwd is high and the pulse train P2 is low the comparator 34 will pull the output 58 to ground via the diode 64. The non-inverting input 70 is then low and no reset is effected. If the watchdog signal Vwd is low and the second pulse train P2 is high the diode 64 will be cut off and the non-inverting input 70 will be low. Again no reset is effected. The filter capacitor 62 removes brief signal peaks produced on the non-inverting input 70 as a result of the delay dT between the second pulse train P2 and the first pulse train P1 owing to the computing time in the microprocessor 2. An active high reset signal can be obtained by interchanging the non-inverting input 68 and the non-inverting input 70 of the comparator 66.

The circuit also has a power-on reset function. When the supply voltage is applied the first pulse train P1 is not yet available so that the output 58 of the comparator 46 may be high when the output 38 of the comparator 34 is also high.

Figure 4:
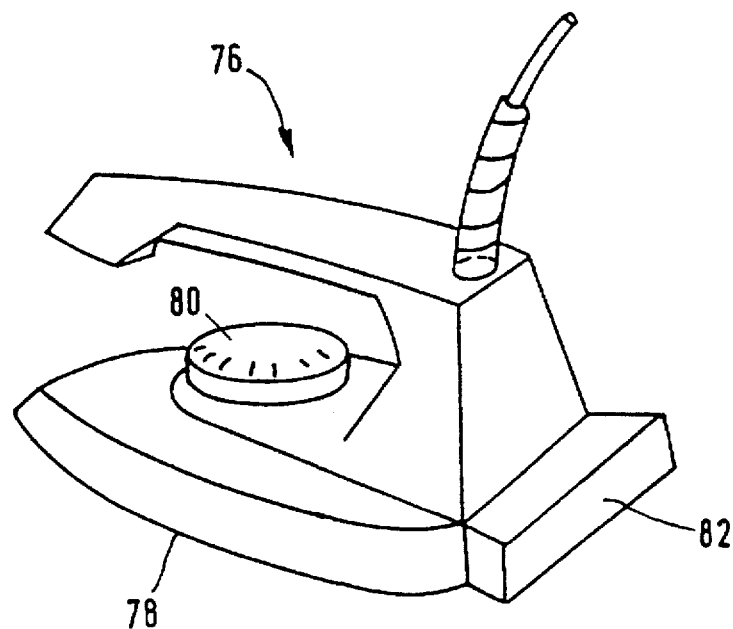
FIG. 4 shows a mains-powered microprocessor-controlled electrical appliance provided with a system in accordance with the invention.
Figure 5:
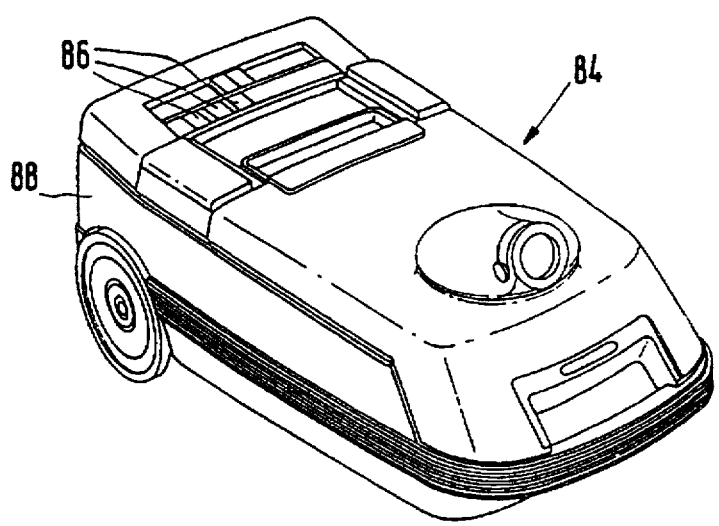
FIG. 5 shows a mains-powered microprocessor-controlled electrical appliance provided with a system in accordance with the invention.

The disclosed system is very suitable for use in mains-powered electrical appliances. FIG. 4 shows a first example with a flat-iron 76 whose soleplate 78 is heated to a temperature which can be set by means of a rotary knob 80. A microprocessor accommodated in a compartment 82 controls the temperature of the soleplate 78 depending on the setting of the rotary knob 80. FIG. 5 shows another use in a microprocessor-controlled vacuum cleaner 84. The microprocessor, inter alia, performs functions under command of control elements 86 arranged on the motor housing 88 or elsewhere.

I claim:

1. A system comprising: a microprocessor, a reset and watchdog circuit, the microprocessor generating a first pulse train (P1) to indicate a correct operation of the microprocessor and the reset and watchdog circuit generating a reset signal (RST) in response to an irregularity in the occurrence of the first pulse train, wherein the first pulse train is generated by an appropriate programming of the microprocessor and is a substantially synchronous software copy of a second pulse train received by the microprocessor, and the reset and watchdog circuit receives the first pulse train (P1) and the second pulse train (P2) and supplies the reset signal (RST) in response to a disturbed synchronism between the occurrence of the first pulse train and the second pulse train.

2. A system as claimed in claim 1, wherein the second pulse train is derived from an a.c. supply voltage.

3. A system as claimed in claim 1 wherein the reset and watchdog circuit comprises a coincidence circuit for supplying the reset signal (RST) when a time difference between the edges of the first pulse train (P1) and the second pulse train (P2) exceeds a predetermined limit.

4. A system as claimed in claim 2 which further comprises:

a first comparator for comparing the instantaneous value of the first pulse train (P1) with a first reference voltage (Vref) and having a first output for supplying a first pulse train (Vwd) which is inverted relative to the first pulse train, a second comparator for comparing the instantaneous value of a limited a.c. supply voltage with a second reference voltage and having a second output for supplying the second pulse train, a diode connected between the first output and the second output, and a third comparator having a first input for receiving the first reference voltage (Vref) and a second input, which is coupled to the first output.

5. A system as claimed in claim 4 which further comprises a low-pass filter for filtering the signal transfer from the first output of the first comparator to the second input of the third comparator.

6. A system as claimed in claim 2, wherein the reset and watchdog circuit comprises a coincidence circuit for supplying the reset signal (RST) when the time between the edges of the first pulse train (P1) and the second pulse train (P2) exceeds a predetermined limit.

7. A system as claimed in claim 3, which further comprises:

a first comparator for comparing the instantaneous value of the first pulse train (P1) with a first reference voltage and having a first output for supplying a first pulse train (Vwd) which is inverted relative to the first pulse train, a second comparator for comparing the instantaneous value of a limited a.c. supply voltage with a second reference voltage and having a second output for supplying the second pulse train (P2), a diode connected between the first output and the second output, and a third comparator having a first input for receiving the first reference voltage and a second input, which is coupled to the first output.

8. An electrical appliance including a system as claimed in claim 3 wherein the appliance comprises:

a mains-powered electric load, the microprocessor controlling control functions of the electric load, wherein the reset and watchdog circuit resets the microprocessor, and the microprocessor and the reset and watchdog circuit form a part of the system.

9. An electrical appliance including a system as claimed in claim 4 wherein the appliance comprises:

a mains-powered electric load, the microprocessor for controlling control functions of the electric load, wherein the reset and watchdog circuit resets the microprocessor, and the microprocessor and the reset and watchdog circuit form a part of the system.

10. An electrical appliance including a system as claimed in claim 5 wherein the appliance comprises:

a mains-powered electric load, the microprocessor for controlling control functions of the electric load, wherein the reset and watchdog circuit resets the microprocessor, and the microprocessor and the reset and watchdog circuit form a part of the system.

11. An AC powered and microprocessor-controlled electrical appliance, which comprises:

an AC powered electric load, a microprocessor for controlling control functions of the electric load, and a reset and watchdog circuit for resetting the microprocessor, wherein the microprocessor and the reset and watchdog circuit comprise a system in which; the microprocessor generates a first pulse train (P1) to indicate a correct operation of the microprocessor and the reset and watchdog circuit generates a reset signal (RST) in response to an irregularity in the occurrence of the first pulse train, wherein the first pulse train is generated by an appropriate programming of the microprocessor and is a substantially synchronous software copy of a second pulse train received by the microprocessor, and the reset and watchdog circuit receives the first pulse train (P1) and the second pulse train (P2) and supplies the reset signal in response to a disturbed synchronism between the occurrence of the first pulse train and the second pulse train.

12. An electrical appliance as claimed in claim 11 wherein the electrical appliance is selected from the group including: flat-iron, coffee maker, electric kettle, deep fryer, roaster, cook-top, oven, grill, microwave oven, hot-plate, room-heating appliance, radiant heater, fan heater, hair dryer, hair curler, bread toaster, sandwich toaster, electric blanket, vacuum-cleaner, coffee grinder, juicer, mixer, fan, timer, solarium, shaver, audio and video equipment, and computer.

13. An electrical appliance which comprises:

a mains-powered electric load, a microprocessor for controlling control functions of the electric load, wherein the microprocessor generates a first pulse train (P1) to indicate a correct operation and programming of the microprocessor, said first pulse train being derived from a second pulse train received by the microprocessor and in substantial synchronism therewith, a reset and watchdog circuit for generating a reset signal (RST) in response to an irregularity in the occurrence of the first pulse train for resetting the microprocessor, and wherein the reset and watchdog circuit receives the first pulse train and the second pulse train and supplies the reset signal to the microprocessor in response to a disturbed synchronism between the occurrence of the first pulse train and the second pulse train.

14. The electrical appliance as claimed in claim 13 further comprising means for deriving the second pulse train from the mains voltage.

15. A system for monitoring the operation of a microprocessor comprising:

means for generating a first pulse train, wherein the microprocessor, during correct operation thereof, is responsive to the first pulse train in order to generate a second pulse train that is in substantial synchronism with the first pulse train thereby to indicate correct operation of the microprocessor, and a reset and watchdog circuit having a first input that receives the first pulse train, a second input that receives the second pulse train, an output coupled to a reset input of the microprocessor, and means responsive to the first and second pulse trains received for generating a reset signal at its output when the first and second pulse trains are out of synchronism by a given amount.

16. The system as claimed in claim 15 wherein the first pulse train generating means comprises an input terminal for connection to a source of sinusoidal AC voltage, and means coupled to said input terminal for deriving from a sinusoidal AC voltage received thereat a substantially rectangular shaped first pulse train whose edges correspond to zero crossover points of said sinusoidal AC voltage.

17. The system as claimed in claim 15 wherein the reset and watchdog circuit comprises a coincidence circuit for supplying the reset signal when a time difference between corresponding edges of the first pulse train and the second pulse train exceeds a predetermined limit and independent of the duty cycle of the first pulse train.

* * * * *